United States Patent [19]

Stroz et al.

[11] 4,248,895

[45] Feb. 3, 1981

[54] DEHYDRATED HIGHER POLYALCOHOLS, COMESTIBLES AND CHEWING GUM CONTAINING SAME AND METHOD

[75] Inventors: John J. Stroz, Monroe, Conn.; Abraham I. Bakal, Parsippany, N.J.; Donald A. M. Mackay, Pleasantville, N.Y.

[73] Assignee: Life Savers, Inc., New York, N.Y.

[21] Appl. No.: 972,121

[22] Filed: Dec. 21, 1978

[51] Int. Cl.³ .................................................. A23G 3/30
[52] U.S. Cl. ........................................ 426/3; 426/658; 426/656; 426/660
[58] Field of Search ........................................ 426/3–6, 426/658, 548, 660, 656, 657

[56] References Cited

U.S. PATENT DOCUMENTS

| | | | |
|---|---|---|---|
| 3,170,801 | 2/1965 | McNaught | 426/548 |
| 3,372,032 | 3/1968 | Van Tittleboom | 426/658 |
| 3,897,566 | 7/1975 | Bahosky et al. | 426/3 |
| 3,915,736 | 10/1975 | Oyamada | 426/548 |
| 4,031,259 | 6/1977 | Lugay | 426/548 |
| 4,154,867 | 5/1979 | Aldrich et al. | 426/658 |

*Primary Examiner*—Jeanette M. Hunter
*Attorney, Agent, or Firm*—Lawrence S. Levinson; Burton Rodney

[57] ABSTRACT

Dehydrated higher polyalcohol compositions such as dehydrated hydrogenated starch hydrolysates, dehydrated maltitol, dehydrated maltotriatol and the like are provided which include a concentrated protein extract to facilitate dehydration thereof. A method for dehydrating higher polyalcohols-concentrated protein extract compositions and comestibles and chewing gum containing the dehydrated product are also provided.

18 Claims, No Drawings

DEHYDRATED HIGHER POLYALCOHOLS, COMESTIBLES AND CHEWING GUM CONTAINING SAME AND METHOD

Current restrictions on the use of many artificial sweeteners, previously used in candies and chewing gums, have created problems of great concern to the confectionary industry. Major research efforts are underway to find non-sugar substitute sweeteners for the restricted artificial sweeteners.

One class of compounds now under study as sugar substitutes are the polyalcohols such as hydrogenated starch hydrolysates such as disclosed in U.S. Pat. No. Re. 26,959 and U.S. Pat. No. 3,556,881, maltitol, isomaltitol, maltotriatol or combinations thereof. These materials are highly hygroscopic and are essentially non-dehydratable by conventional methods. Many product applications are dependent on the availability of a non-hygroscopic free-flowing powder.

Various techniques have been tried for drying the above-mentioned polyalcohols such as conventional spray-drying, and freeze-drying. Spray drying techniques are unsatisfactory because of atomizer blockage and formation of glassy deposits. Other more sophisticated drying techniques, such as freeze-drying and foam-mat drying, are uneconomical.

U.S. Pat. No. 3,833,413 to Glabe et al discloses a method for drying high fructose corn syrup wherein a high protein, high water-soluble soy protein with or without wheat starch is incorporated with a high fructose corn syrup to form a slurry and the slurry is subsequently dehydrated as a thin film on a heated surface. Where the wheat starch is present, the soy protein is employed in at least a 0.5:70 ratio to the corn syrup, where the wheat starch is not employed, the soy protein is employed in at least a 30:70 ratio to the corn syrup. Glabe et al indicate in Column 8 starting at line 17 that the other protein containing substances such as defatted sesame seed flour, cotton seed flour, gelatinized corn flour, lactalbumen, crystalline cellulose, wheat gluten, corn flour, barley flour, dried egg albumen, animal gelatin, autolyzed yeast and dried buttermilk are unsuitable as substitutes for soy protein.

DESCRIPTION OF THE INVENTION

It has now surprisingly been found that higher polyalcohols (that is, those having more than two hydroxyl groups), for example, hydrogenated starch hydrolysates, such as disclosed in U.S. Pat. No. Re. 26,959 and U.S. Pat. No. 3,556,881, maltitol, hydrogenated dextrins and the like, when subjected to the drying technique detailed below, wherein the higher polyalcohol is first mixed with a concentrated protein extract and then the mixture is spray-dried or drum-dried, a free-flowing substantially non-hygroscopic powder is produced. The free-flowing powdery product is suitable for use as a sweetener in candy, chewing gum, and other confections and comestibles as will be seen hereinafter.

Thus, in accordance with the present invention, there is provided a substantially dehydrated, substantially non-hygroscopic free-flowing powder comprising a higher polyalcohol in admixture with a concentrated protein extract which may be employed in candies and chewing gum.

Further, in accordance with the present invention, there is provided a method for drying higher polyalcohols wherein the higher polyalcohol, preferably, in aqueous solution, is admixed with a concentrated protein extract and the resulting mixture is heated at a sufficiently high temperature for a sufficient period to effect drying of the polyalcohol to a free-flowing substantially non-hygroscopic powder.

In addition, in accordance with the present invention, there is provided candy, chewing gum, other confections and comestibles which contain as a sweetener substantially non-hygroscopic higher polyalcohol-concentrated protein extract mixtures which have been dried as described herein.

The higher polyalcohols which are to be dried in accordance with the present invention may include hydrogenated corn syrups or hydrogenated starch hydrolysates of varying dextrose equivalents (DE), such as disclosed in U.S. Pat. No. 26,959 and U.S. Pat. No. 3,556,811 as well as various hydrogenated glucose syrups and/or reconstituted powders which contain sorbitol, hydrogenated disaccharides, tri- to hexa-hydrogenated saccharides, and hydrogenated higher polysaccharides, or mixtures of any two or more of the above.

The hydrogenated glucose syrups or hydrogenated starch hydrolysates and/or powders thereof may be produced by catalytic hydrogenation of standard glucose syrups (acid and/or enzyme converted) to the point where all the glucose end groups of the saccharides are reduced to alcohols, that is, dextrose to sorbitol. In the case of hydrogenated glucose syrups, the total solids contents will range from about 72 to about 80% which solids are made of from about 4 to about 20% sorbitol, from about 20 to about 65% hydrogenated disaccharides (that is, maltitol), from about 15 to about 45% tri- to hepta-hydrogenated saccharides, and from about 10 to about 35% hydrogenated saccharides higher than hepta.

The above-described higher polyalcohols will normally contain from about 15 to about 40% water which may be reduced down to from about 6 to about 2% water in accordance with the present invention so that the higher polyalcohol may be obtained as a free-flowing powder which may be employed as a sweetener for chewing gums and other confections and comestibles.

The concentrated protein extract, which is admixed with the higher polyalcohol to be dried, will comprise substantially pure protein, that is, at least 90% or more protein, and will be employed in the form of a powdery material. These materials when in admixture with the polyalcohols at the concentrations called for by the present invention are practically tasteless and are non-reactive with the higher polyalcohols and other sweeteners, colors, flavors and ingredients employed with the higher polyalcohols needed to form chewing gum or other confections or comestibles. Thus, they do not detract from the palatability or flavor of the above edible materials.

Examples of suitable concentrated protein extracts suitable for use herein include, but are not limited to egg albumin, soy protein isolates, oilseed proteins, such as sesame, peanuts, sunflavor, rapeseed, cocoanut, and cottonseed, caseinates, such as sodium casein, calcium casein and casein, as well as whey proteins, such as lactalbumin, leaf proteins, such as alfalfa and grass and the like. Preferred are the egg albumin or egg whites and soy protein isolates.

The concentrated protein extracts will be employed in a weight ratio to the higher polyalcohol to be dried within the range of from about 0.01:1 to about 0.2:1 and preferably from about 0.04:1 to about 0.1:1. In preferred formulations, the concentrated protein extracts will comprise egg whites or soy protein isolate and the polyalcohols to be dried will comprise hydrogenated starch hydrolysates containing from about 20 to about 60% by weight water. In such case, the egg whites or soy protein isolate will be employed in a weight ratio to the hydrogenated starch hydrolysate of within the range of from about 0.01:1 to about 0.2:1, and preferably from about 0.02:1 to about 0.1:1.

The mixture of the polyalcohol and concentrated protein extract of the invention after being dried in accordance with the present invention will comprise a free-flowing powder containing at most about 6% water, and preferably less than about 3% water. In such form, the co-dried free-flowing powder may be employed in a wide variety of edibles wherein it is desired to replace all or a portion of the sucrose present therein with a non-sugar, non-cariogenic sweetener. Such edibles encompass a wide variety of foods and confections including chewing gum, hard candies, mint candies, soft candies, caramels, toffees, toppings, cakes, ice cream, sherbets, chocolates, beverages, and the like.

The method of the present invention for drying the higher polyalcohols includes the steps of admixing the concentrated protein extract with an aqueous solution of the higher polyalcohol to be dried, heating the mixture to a temperature of within the range of from about 40° to about 210° F., and preferably from about 70° to about 160° F., and thereafter drying the mixture at an inlet air temperature of from about 212° to about 400° F. In the latter step, the above mixture is preferably atomized and introduced as a mist into a conventional spray dryer. Hot air (at a temperature ranging from about 200° to about 400° F.) is then introduced into the spray dryer preferably counter current to the flow of the above mixture.

Furthermore, in accordance with the present invention, a chewing gum composition is provided which has improved softness retention properties and in preferred embodiments has improved shelf life and long-term flexibility. The chewing gum composition of the invention includes gum base, as a sweetener the dried mixture of the higher polyalcohol and concentrated protein extract of the invention; optionally one or more sugar alcohols, such as sorbitol, mannitol or xylitol; optionally one or more additional sweetening agents, such as sugar and/or non-sugar sweeteners; and optionally additional flavoring materials, one or more softeners, plasticizers, emulsifiers and/or fillers.

The preferred chewing gum composition of the present invention comprises a sugarless chewing gum wherein the dried higher polyalcohol comprises dried hydrogenated starch hydrolysate (in admixture with concentrated protein extract) employed in combination with a sugar alcohol, such as sorbitol, mannitol and/or xylitol or hydrogenated starch hydrolysate in syrup form. The dried hydrogenated starch hydrolysate-protein mixture will be employed in a weight ratio to the sugar alcohol or hydrogenated starch hydrolysate in syrup form (containing from about 15 to about 40% by weight solids) of within the range of from about 0.9:1 to about 0.1:1, and preferably from about 0.6:1 to about 0.1:1. Such preferred sugarless compositions contain from about 2 to about 75%, and preferably from about 2 to about 60% by weight hydrogenated starch hydrolysate-protein mixture, and the sugar alcohol or hydrogenated starch hydrolysate syrup is present in an amount within the range of from about 10 to about 75%, and preferably from about 10 to about 65% by weight.

It will be appreciated that the sugar alcohol where present may be employed in the form of a powder or aqueous syrup or solution or a combination of powder and solution (such as sorbitol powder and sorbitol solution) in a weight ratio of powder:solution of within the range of from about 6:1 to about 2:1. Use of the sugar alcohol in the form of the syrup or solution increases moisture content and thus softness of the gum.

The chewing gum will include a relatively water-insoluble, water-impenetrable gum base in an amount ranging from about 8 to about 50%, and preferably from about 15 to 40% by weight of the chewing gum composition.

In general, the gum base is prepared by heating and blending various ingredients, such as, natural gum, synthetic resins, waxes, plasticizers, etc., in a manner well known in the art. Typical examples of the ingredients found in a chewing gum base are masticatory substances of vegetable origin, such as chicle, crown gum, nispero, rosidinha, jelutong, pendare, perillo, niger gutta, tunu, etc., masticatory substances of synthetic origin, such as butadiene-styrene polymer, isobutylene-isoprene copolymer, petroleum wax, polyethylene, polyisobutylene, polyvinylacetate, etc., plasticizers, such as lanolin, stearic acid, sodium stearate, potassium stearate, etc., antioxidants, such as, butylated hydroxyanisole, butylated hydroxytoluene, and propyl gallate.

The water-insoluble gum base may consist of any of the various bases disclosed for example in U.S. Pat. Nos. 3,052,552 and 2,197,719.

The chewing gum may also include flavoring, such as sour or fruit flavoring or non-acid or mint flavoring in an amount ranging from about 0.3 to about 2.0% by weight, and preferably from about 0.5 to about 1.2% by weight of the final gum product. The flavoring may comprise synthetic flavors and oils derived from plants, leaves, flowers, fruit, etc. Representative flavor oils of this type include acids such as adipic, succinic and fumaric acid, citrus oils such as lemon oil, orange oil, lime oil, grapefruit oil, fruit essences such as apple essence, pear essence, peach essence, strawberry essence, apricot essence, raspberry essence, cherry essence, plum essence, pineapple essence, as well as the following essential oils: peppermint oil, spearmint oil, mixtures of peppermint oil and spearmint oil, clove oil, bay oil, anise oil, eucalyptus oil, thyme oil, cedar leaf oil, cinnamon oil, oil of nutmeg, oil of sage, oil of bitter almonds, cassia oil, and methylsalicylate (oil of wintergreen). Various synthetic flavors, such as mixed fruit, may also be incorporated in the chewing gum with or without conventional preservatives.

The dried higher polyalcohols may be employed in conjunction with a natural sugar or non-sugar sweetener. The natural sugar may be present in an amount ranging from about 90 to about 0.5%.

The term "natural sugar" includes one or more sugars or sugar containing material, for example, monosaccharides of 5 or 6 carbon atoms, such as, arabinose, xylose, ribose, glucose, mannose, galactose, fructose, dextrose, or sorbose or mixtures of two or more of the foregoing monosaccharides; disaccharides, such as, sucrose, for example, cane or beet sugar, lactose, maltose or cellobiose; and polysaccharides, such as, partially hydrolyzed starch, dextrin or corn syrup solids.

In addition, as mentioned hereinbefore, the dried higher polyalcohols may be employed together with an artificial sweetener such as poorly water-soluble as well as water-soluble sweeteners, such as the free acid form of saccharin, sodium, calcium or ammonium saccharin salts, dihydrochalcones, glycyrrhizin, dipotassium glycyrrhizin, glycyrrhizic acid ammonium salt, L-aspartyl-L-phenylalanine methyl ester, as well as *Stevia rebaudiana* (Stevioside), *Richardella dulcifica* (Miracle Berry), *Dioscoreophyllum cumminisii* (Serendipity Berry), free cyclamic acid and cyclamate salts, and the like, or mixtures of any two or more of the above.

The chewing gum of the invention may also contain conventional ester gums, polydextrose, fillers, such as calcium carbonate, and texturizers, such as hydrated alumina, plasticizers, softeners or emulsifiers, such as lecithin, fatty acids, glycerine, glyceryl monostearate, hydrogenated vegetable oils, sorbitan monostearate, tallow, propylene glycol, F.D.&C. coloring agents, and other conventional chewing gum additives as will be apparent to those skilled in the art.

The chewing gum of the invention may be prepared employing conventional chewing gum manufacturing techniques. However, the various sweeteners and/or dried higher polyalcohols, such as, hydrogenated starch hydrolysates may be provided in a form to ensure relatively slow release or slow solubilization in the saliva. Thus, for example, the sweetener and/or dried hydrogenated starch hydrolysate may be coated with, integrated with or encapsulated with non-toxic water-insoluble polymeric substances such as polyvinyl esters disclosed in U.S. Pat. Nos. 3,826,847 and 3,795,744, organic acids as disclosed in U.S. Pat. No. 3,761,288, or other known edible materials as, for example, any of the fusing agents disclosed in U.S. Pat. No. 3,928,633, as well as hydrophilic colloids such as ethyl cellulose, paraffin wax or sodium alginate. The sweetener and/or dried hydrogenated starch hydrolysate so-modified and employed in conjunction with conventional carriers as described above, will be slowly solubilized in the saliva over extended periods of time.

Alternatively, where it is desired to achieve slow release, the dried higher polyalcohol and/or other non-sugar sweetener (where employed) will be in particulate form having an average particle size of below about 150 microns (0.150 mm or about 100 mesh), and will be incorporated into the gum base portion of the chewing gum. The particulate compound will be substantially retained in the gum base, and during chewing undergoes slow and controlled release into the saliva.

The slowly or controlledly released non-sugar sweetener containing chewing gums may be prepared by admixing melted gum base with a plasticizer, such as a syrupy substance, for example, hydrogenated starch syrup or corn syrup, or a modified starch syrup or sorbitol syrups, at a temperature ranging from about 180 to about 210° F., to form a base-syrup mix, optionally adding flavor oil to the mix, during the first five minutes of mixing while the mix is folding well admixing the base-syrup mix with particulate non-sugar sweetener (that is, the dried hydrogenated starch hydrolysate), to form a continuous gum base having the particles of non-sugar sweetener intimately dispersed therein, and thereafter, optionally admixing the above mix with one or more easily extractable water-soluble sweeteners, such as natural sugar, soluble saccharin salts, water-soluble food acid and/or flavors. The resulting mix is then formed into sticks or tablets of chewing gum employing conventional techniques.

Where, in the above method, it is desired to employ a soluble non-sugar sweetener in a chewing gum containing an aqueous plasticizer (such as the hydrogenated starch hydrolysate in syrup form), the soluble non-sugar sweetener will be added to the gum base ingredients before the aqueous plasticizer is added thereto. In this manner, the soluble non-sugar sweetener will be transferred to the gum base and will not be first dissolved in the plasticizer.

Preferred sugarless chewing gums in accordance with the present invention wherein the dried higher polyalcohol is employed as a sugar substitute will have the following compositions:

| | Parts by weight |
|---|---|
| Gum base | 20–35 |
| Sorbitol powder | 0–45 |
| Dried hydrogenated starch hydrolysate:protein extract (1:0.4) | 3–60 |
| Hydrogenated starch hydrolysate or sorbitol solution (containing 15 to 40% solids) | 15–25 |
| Softener (lecithin) | 0.2–2 |
| Flavor | 0.5–2.5 |
| Non-sugar sweetener | 0–1.5 |

Preferred sugarless chewing gum in accordance with the present invention wherein the hydrogenated starch hydrolysate is employed in place of sorbitol powder and solution (as both the plasticizer and sweetener) will have the following compositions:

| | Parts by Weight |
|---|---|
| Gum base | 20–35 |
| Dried hydrogenated starch hydrolysate (powder) | 45–65 |
| Hydrogenated starch hydrolysate syrup (on dry basis) | 5–15 |
| Softener (lecithin) | 0.2–2 |
| Other non-sugar sweetener | 0–1.5 |
| Flavor | 0.5–2.5 |
| Filler (calcium carbonate) | 0–15 |

Preferred sugar or bubble gum formulations in accordance with the present invention are as follows:

| | Parts by Weight |
|---|---|
| Gum base | 13–20 |
| Sugar | 20–30 |
| Dried hydrogenated starch hydrolysate | 25–35 |
| Hydrogenated starch hydrolysate syrup | 15–30 |
| Softener (lecithin) | 1–3 |
| Glycine | 0.1–1 |
| Flavor | 0.3–1.5 |
| Colorant | 0.01–0.07 |

The following Examples illustrate preferred embodiments of the present invention without, however, limiting the same thereto. All temperatures are expressed in °F.

EXAMPLE 1

Preparation of "Dried" Hydrogenated Starch Hydrolysate-Egg White Mixture

To 100 g of hydrogenated starch hydrolysate containing 81.3% solids including 8% sorbitol and 8% maltitol, and 19.7% water, there is added 50 g of water.

To this diluted syrup, 5 g egg white solids are added with mixing to form a solution. The solution is heated to 140°–150° F. and then fed at the rate of 3 gal/hr as a mist into a 15 gal/hr capacity pilot plant anhydro spray dryer equipped with an atomizer. Air is introduced into the spray dryer at a temperature of about 300° F. The spray-dried material is recovered as a free-flowing substantially dry solid.

As a control, the above procedure is repeated except that egg white solids are not employed.

It is found that the hydrogenated starch hydrolysate without the egg whites cannot be dehydrated into flowable powder by spray drying. The hydrogenated starch hydrolysate blocks the atomizer nozzles and coats the drying chamber surfaces with glassy material.

EXAMPLE 2

Sugarless chewing gums are prepared from the following ingredients.

| | Parts by Weight | |
|---|---|---|
| Ingredients | Example 2 Gum | Control |
| Gum base | 26 | 26 |
| Powdered Sobitol | — | 50 |
| Dried hydrogenate starch hydrolysate (containing 4% egg whites) | 50 | — |
| Sorbo syrup | — | 21 |
| Hydrogenate starch hydrolysate syrup (containing 8% sorbitol, 8% maltitol and 20% water) | 21 | — |
| Lecithin | 0.9 | 0.9 |
| Spearmint oil | 1 | 1 |
| Spray-dried spearmint flavor | 0.75 | 0.75 |

The spray-dried material (containing 4% egg albumin) prepared in Example 1 is used in the preparation of the chewing gums.

The chewing gum is prepared by melting the gum base, adding the lecithin and mixing for 2 minutes. The flavor oil is added, mixed for 3 minutes followed by the addition of the powdered sweetener (sorbitol or dried hydrogenated starch hydrolysate) and mixing for 5 minutes. The syrups (sorbitol or hydrogenated starch hydrolysate) are added and the mass is mixed for 3 minutes. The spray-dried flavor is added, mixed for 2 minutes. The chewing gum is then removed from the kettle, rolled and served.

The Example 2 chewing gum containing dried hydrogenated starch hydrolysate is evaluated against the control gum containing sorbitol powder. Both gums are found to be highly acceptable in flavor and sweetness.

EXAMPLE 3

A sugarless chewing gum is prepared from the following ingredients employing the procedure outlined in Example 2.

| | Parts by Weight |
|---|---|
| Gum base | 30 |
| Dried hydrogenated starch hydrolysate powder (containing 4% egg whites) | 55 |
| Hydrogenated starch syrup (on dry basis) | 10 |
| Lecithin | 1 |
| Cinnamon flavor (liquid) | 1 |
| Cinnamon flavor (spray-dried) | 1 |
| Sodium saccharin | 0.1 |

EXAMPLE 4

A sugarless chewing gum is prepared from the following ingredients employing the procedure of Example 1.

| | Parts by Weight |
|---|---|
| Gum base | 25 |
| Sorbitol solution (69%) | 21 |
| Dried hydrogenate starch hydrolysate (prepared as in Ex. 1) | 60 |
| Lecithin | 0.5 |
| Flavor | 1.6 |
| Color | 0.07 |

The above chewing gums of Examples 3 and 4 are found to have properties similar to that of the Example 2 gum.

EXAMPLE 5

A sugar containing bubble gum in accordance with the present invention is prepared from the following ingredients;

| | Parts by Weight |
|---|---|
| Gum base | 15 |
| Hydrogenated starch hydrolysate syrup | 25 |
| Dried hydrogenated starch hydrolysate (prepared as in Ex. 1) | 30 |
| Lecithin | 2 |
| Sugar | 30 |
| Colorant | 0.05 |
| Glycerin | 0.5 |
| Flavor | 0.5 |

The gum base is melted (temperature kept below 200°) and placed in a standard dough mixer equipped with sigma blades. Colorants and hydrogenated starch syrup are added and mixed for 5 minutes. Thereafter, ⅓ of the sugar, the dried hydrogenated starch hydrolysate, lecithin, another ⅓ of the sugar, flavor, and finally the last ⅓ of the sugar are added. After mixing for 1–2 minutes, glycerine is added. After a total of 5 minutes of mixing from the point of addition of sugar, the mixing is stopped.

The bubble gum produced is soft and pliable.

What is claimed is:

1. A substantially dry free-flowing particulate sweetener composition consisting essentially of a hydrogenated starch hydrolysate in admixture with a concentrated protein extract, said concentrated protein extract containing at least 90% protein and being selected from the group consisting of egg albumin, soy protein isolates, caseinates, oilseed proteins, whey proteins and leaf proteins, said hydrogenated starch hydrolysate being present in a weight ratio to said concentrated protein extract of within the range of from about 85:1 to about 5.5:1, said sweetener combination containing less than 6% water and having a sweetness level equivalent to the hydrogenated starch hydrolysate itself, and being in substantially dry free-flowing powder form.

2. The sweetener composition as defined in claim 1 wherein said concentrated protein extract comprises egg albumin.

3. A food product comprising a comestible and a dried hydrogenated starch hydrolysate-concentrated protein extract as defined in claim 1.

4. The food product as defined in claim 3 wherein said comestible is a chewing gum.

5. The food product as defined in claim 3 wherein said comestible is a hard candy or mint candy.

6. The food product as defined in claim 4 wherein said dried hydrogenated starch hydrolysate is present in an amount within the range of from about 2 to about 60% by weight.

7. The food product as defined in claim 6 further including a sugar alcohol comprising from about 10 to about 75% by weight sorbitol.

8. The food product as defined in claim 6 in the form of a sugarless chewing gum further including hydrogenated starch hydrolysate present in the form of a syrup (5 to 15% by weight of gum).

9. The food product as defined in claim 6 further including from about 0.05 to about 90% by weight sugar.

10. The food product as defined in claim 9 in the form of a bubble gum comprising from about 13 to about 20% by weight gum base, from about 45 to about 65% by weight sugar, and from about 1 to about 3% by weight lecithin.

11. The food product as defined in claim 6 in the form of a sugarless gum comprising from about 25 to about 35% by weight gum base, from about 35 to about 45% by weight sorbitol powder, from about 3 to about 10% by weight dried hydrogenated starch hydrolysate powder, from about 15 to about 25% by weight sorbitol solution, from about 0.05 to about 1.5% by weight artificial sweetener, and from about 0.5 to about 2% by weight lecithin.

12. The food product as defined in claim 6 wherein said hydrogenated starch hydrolysate is prepared by hydrogenating saccharified starch having a dextrose equivalent of 15–75% and containing dextrines until substantially no dextrose and maltose remain.

13. The food product as defined in claim 6 wherein said hydrogenated starch hydrolysate comprises from about 72% to about 80% of solids of which from about 4 to about 20% is sorbitol, from about 20 to about 65% is hydrogenated disaccharides, from about 15 to about 45% is tri- to hepta-hydrogenated saccharides, and from about 10 to about 35% is hydrogenated saccharides higher than hepta.

14. The food product as defined in claim 5 wherein said solids portion of said hydrogenated starch hydrolysate contains from about 6 to about 10% sorbitol, and from about 25 to about 55% by weight hydrogenated disaccharides, from about 20 to about 40% tri- to hepta-hydrogenated saccharides, and from about 15 to about 30% hydrogenated saccharides higher than hepta.

15. A method for preparing a substantially dry free-flowing particulate sweetener composition as defined in claim 1 which comprises admixing hydrogenated starch hydrolysate and concentrated protein extract in a weight ratio of hydrogenated starch hydrolysate to protein extract of from about 99:1 to about 9:1, to form an aqueous solution, heating said solution at a temperature within the range of from about 40° to about 210° F., and drying the mixture at an air inlet temperature within the range of from 212° to about 400° F. to form a free-flowing substantially non-hygroscopic powder.

16. The method as defined in claim 15 wherein said hydrogenated starch hydrolysate is dried by spray drying.

17. The method as defined in claim 15 wherein said concentrated protein extract is egg white or soy protein isolate, or caseinate.

18. The method as defined in claim 15 wherein said concentrated protein extract to be dried is present in a weight ratio to said hydrogenated starch hydrolysate of within the range of from about 0.01:1 to about 0.2:1.

* * * * *